United States Patent [19]

Matsumoto

[11] Patent Number: 5,041,906

[45] Date of Patent: Aug. 20, 1991

[54] DIGITAL VIDEO SIGNAL PROCESSING METHOD AND APPARATUS THEREFOR

[75] Inventor: Tokikazu Matsumoto, Osaka, Japan

[73] Assignee: Matsushita Electric Industrial Co., Ltd., Kadoma, Japan

[21] Appl. No.: 350,984

[22] Filed: May 12, 1989

[30] Foreign Application Priority Data

May 13, 1988 [JP] Japan .................. 63-117304

[51] Int. Cl.⁵ .................. H04N 7/13; H04N 11/04
[52] U.S. Cl. .................. 358/21 R; 358/13
[58] Field of Search .......... 358/13, 21 R, 23, 31, 358/138

[56] References Cited

U.S. PATENT DOCUMENTS 4,496,967 1/1985 Sase et al. .................. 358/37

FOREIGN PATENT DOCUMENTS 0081223 6/1983 European Pat. Off. .
0177320 4/1986 European Pat. Off. .
3537810 4/1987 Fed. Rep. of Germany .
203386 12/1982 Japan .................. 358/13

OTHER PUBLICATIONS

"Proceedings of the IEEE", vol. 69, No. 3, 1981, "Interpolation and the Decination of Digital Signals—A Intorial Review" pp. 300–331.

Primary Examiner—John W. Shepperd
Attorney, Agent, or Firm—Cushman, Darby & Cushman

[57] ABSTRACT

A video signal is sampled with a sampling frequency which is at least four times of the highest frequency of the video signal, subsequently, sampled signals are converted into digital signals and component thereof which are higher than the highest frequency of the video signal are eliminated by a low pass filter, then, remaining sampled signals are alternately decimated by a decimation circuit, thus the sampling frequency is reduced in appearance to the half thereof.

6 Claims, 6 Drawing Sheets

DIGITAL VIDEO SIGNAL PROCESSING METHOD AND APPARATUS THEREFOR

FIELD OF THE INVENTION

The present invention relates to a digital video signal processing apparatus for processing an A/D-converted video signal including a carrier chrominance signal.

DESCRIPTION OF THE RELATED ART

Recently, in a digital video signal processing technique, a digital video signal processing method utilizing a sampling frequency synchronized with a horizontal synchronizing signal is introduced in order to process a video signal every one scanning line or one video frame. In the digital video signal processing method in the prior art, when the characteristics of an A/D converter or an analog circuit for supplying an analog signal to the A/D converter has a distortion, a carrier chrominance signal in the video signal is distorted, and some harmonics are produced in a video signal frequency range. The harmonics are sampled in the A/D-converting process and resonate with a clock signal, and the carrier chrominance signal or a luminance signal is interfered thereby.

FIG. 5 shows spectrum distribution of the video signal of the NTSC color television system in the prior art. Referring to FIG. 5, the ordinate designates levels of signals and the abscissa designates frequency. An arrow "k" represents the carrier chrominance signal of 3.58 MHz. An arrow "m" represents the triple harmonic (10.7 MHz) of the carrier chrominance signal (3.58 MHz), and an arrow "o" represents the quadruple harmonic (14.32 MHz) thereof. The frequency of a sampling signal is 13.5 MHz. Spectra of a luminance signal are shown by dashed lines L. An arrow "l" represents an aliasing signal (9.92 MHz) of the carrier chrominance signal "k". The signal represented by an arrow "n" is an aliasing signal of the signal shown by the allow "o", and the signal represented by an arrow "i" is an aliasing signal of the signal shown by the allow "n". The signal shown by an arrow "j" is an aliasing signal of the signal shown by the arrow "m". Frequency of the signal shown by the arrow "i" is 0.82 MHz (14.32−13.5 =0.82), and that of the arrow "j" is 2.76 MHz (13.5−10.7=2.76). The signals shown by the arrows "i" and "j" interfere with the luminance signal frequency range L.

When the sampling signal (13.5 MHz) is in synchronism with a horizontal synchronizing signal, the signal shown by the arrow "i" is also in synchronism with the horizontal synchronizing signal. Consequently, undesirable vertical bars arise on luminance of a video image. Furthermore, since a frequency difference between the signal shown by the arrow "j" and the carrier chrominance signal shown by the arrow "k" is only 820 KHz, a vertical bar arises on a color video image by beat interference between both the signals.

FIG. 6 shows spectrum distribution of the video signal of the PAL color television in the prior art. The frequency of the carrier chrominance signal shown by an arrow "Pk" is 4.43 MHz. The triple harmonics of the carrier chrominance signal (13.29 MHz) is represented by an arrow "Pm", and the quadruple harmonics (17.72 MHz) is represented by an arrow "Po". The aliasing signal of the triple harmonic (13.29 MHz) is represented by an arrow "Pj", and the aliasing signals of the quadruple harmonic (17.72 MHz) are represented by arrows "Pi" and "Pn". The signal shown by the arrow "Pi" interferes with the chrominance signal L, and the signal shown by the arrow "Pj" interferes with the luminance signal. Then the beat frequency between both the signals shown by the arrows "Pi" and "Pk", respectively is 0.21 MHz.

In order to eliminate the above-mentioned beat interference in the prior art, in the standard video signal in which the carrier chrominance signal is in synchronism with a horizontal synchronizing signal, there is a method that the sampling frequency is selected to be four times of the carrier chrominance signal, so that the aliasing signals of the harmonics of the carrier chrominance signal overlap on the carrier chrominance signal, thereby to prevent beat interference between the aliasing signal and the carrier chrominance signal is avoidable.

For instance, in the video signal of the standard NTSC color television, the relation between a color subcarrier frequency $f_{sc}$ and the frequency of the horizontal synchronizing signal $f_H$ is represented by $$f_{sc}=(455/2)f_H.$$

Therefore, when the frequency of the sampling signal is selected to 910 times of a horizontal synchronizing signal, the frequency of the horizontal synchronizing signal is equal to four times of the carrier chrominance signal. Consequently, synchronization between the sampling signal and the horizontal synchronizing signal results in synchronization between the sampling signal and the carrier chrominance signal. Hence, beat interference in the luminance signal is avoidable.

However, in the so called nonstandard video signal, since the carrier chrominace signal is not in synchronism with the horizontal signal, synchronization between the sampling signal and the horizontal signal does not always result in synchronization between the sampling signal and the carrier chrominance signal. Thus, flicker noise arises on the video image due to the aliasing signal of the harmonics which are slightly different from the carrier chrominance signal.

OBJECT AND SUMMARY OF THE INVENTION

An object of the present invention invention is to provide a digital video signal processing apparatus in which beat interference due to aliasing signal of harmonics of a carrier chrominance signal is eliminated in A/D-converting of a video signal including the carrier chrominance signal.

The digital video signal processing apparatus in accordance with the present invention comprises:

sampling means for sampling a video signal with a sampling frequency of at least four times of a frequency range of the video signal.

an A/D converter for converting sampled signals of the video signal to digital signals.

a digital low pass filter having a cut-off frequency of the frequency range of the video signal, and a decimation circuit for reducing a sampling frequency in appearance to at least two times of the frequency range of the video signal by decimating the number of the digital signals.

While the novel features of the invention are set forth particularly in the appended claims, the invention, both as to organization and content, will be better understood and appreciated, along with other objects and

DESCRIPTION OF THE PREFERRED EMBODIMENTS

Figure 1:
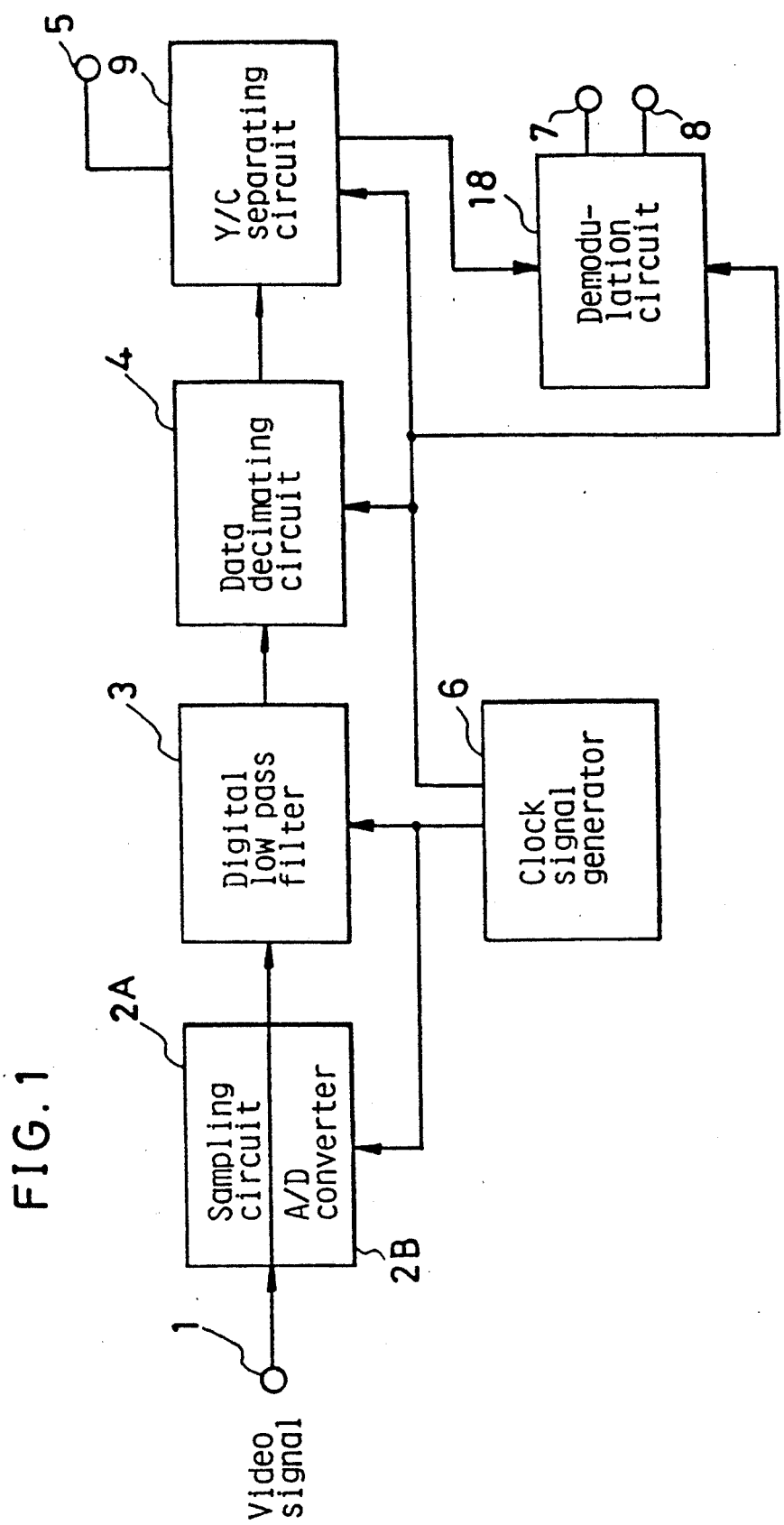
FIG. 1 is a block diagram of an embodiment of a digital video signal processing apparatus in accordance with the present invention.

FIG. 1 is a block diagram of an embodiment of the digital video signal processing apparatus in accordance with the present invention. Referring to FIG. 1, a video signal including a carrier chrominance signal is sampled by a sampling circuit 2A and is converted into digital signals of a predetermined bits, for example 8 bits, by an A/D converter 2B. A frequency range of the sampled video signal which is represented by the digital signal is limited by a digital low pass filter 3. Then the data of the digital signals are decimated by a data decimation circuit 4 and are applied to a Y/C-separating circuit 9. A luminance signal is separated from a carrier chrominance signal by the Y/C-separating circuit 9, and the luminance signal is output from the output terminal 5. The carrier chrominance signal is applied to a demodulation circuit 18. In the demodulation circuit 18, the carrier chrominance signal is demodulated to two color difference signals of R−Y signal and B−Y signal, for example, and these color difference signals are output through terminals 7 and 8, respectively. These two digital color difference signals are recorded on a recording medium such as a magnetic tape, for example, or are memorized in a semiconductor memory for accomplishing digital image processing. A clock signal of a clock signal generator 8 is supplied to the sampling circuit 2A, the A/D converter 2B and the digital low pass filter 3, and another clock signal therefrom is supplied to the data decimation circuit 4, the Y/C-separating circuit 9 and the demodulating circuit 18.

Figure 2:
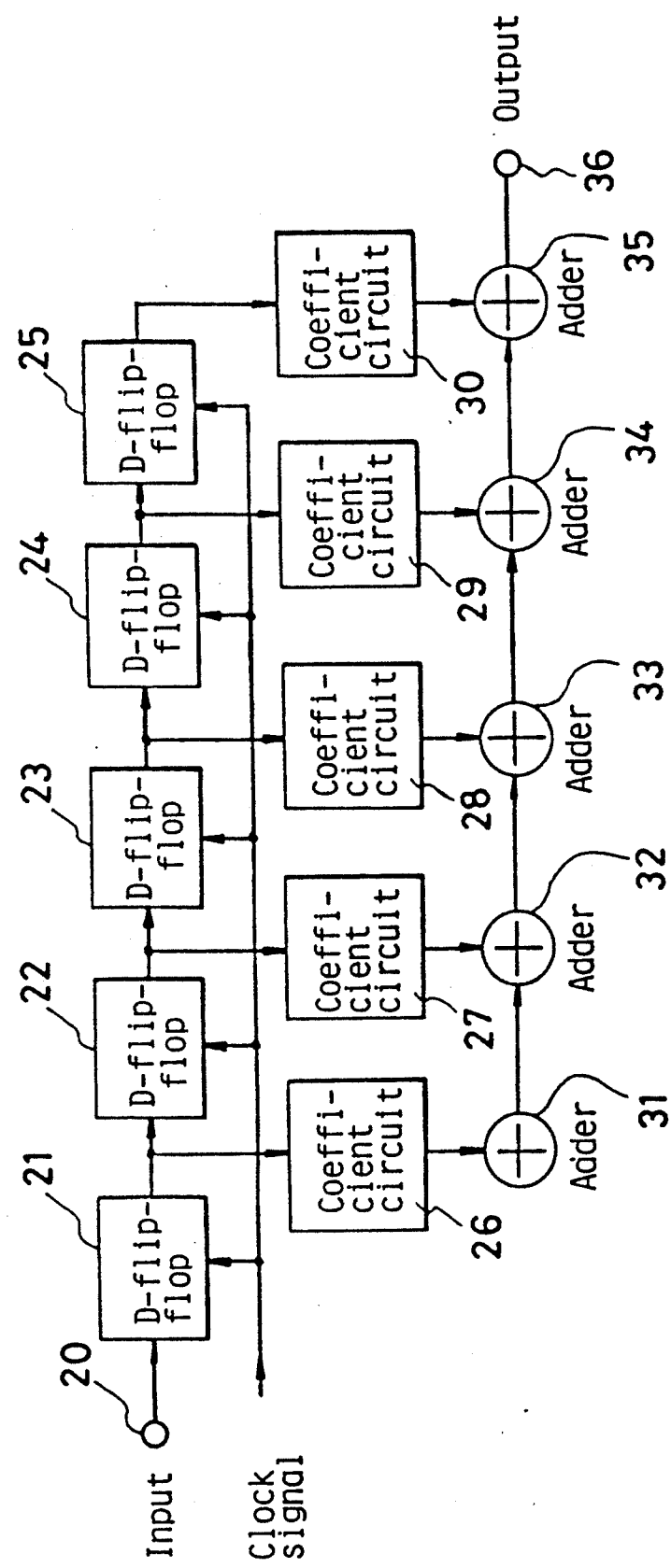
FIG. 2 is a block diagram of the digital filter in the block diagram of the embodiments.

A transversal filter as shown in FIG. 2 is usable as the digital low pass filter 3. Referring to FIG. 2, D-flip-flops 21, 22, 23, 24 and 25 delay an inputted digital signal from an input terminal 20 by a periodic time of a clock signal. Coefficient circuits 26, 27, 28, 29 and 30 multiply the output digital signals of the respective D-flip-flops 21, 22, 23, 24 and 25 by predetermined coefficients, respectively. Adders 31, 32, 33, 34 and 35 add output digital signals of the respective coefficient circuits 26, 27, 28, 29 and 30 in a time sequence.

The number of the D-flip-flops 21, 22, 23, 24 and 25 and the coefficients of the respective coefficient circuits 26, 27, 28, 29 and 30 are selected corresponding to the characteristic of the digital low pass filter 3.

Figure 3:
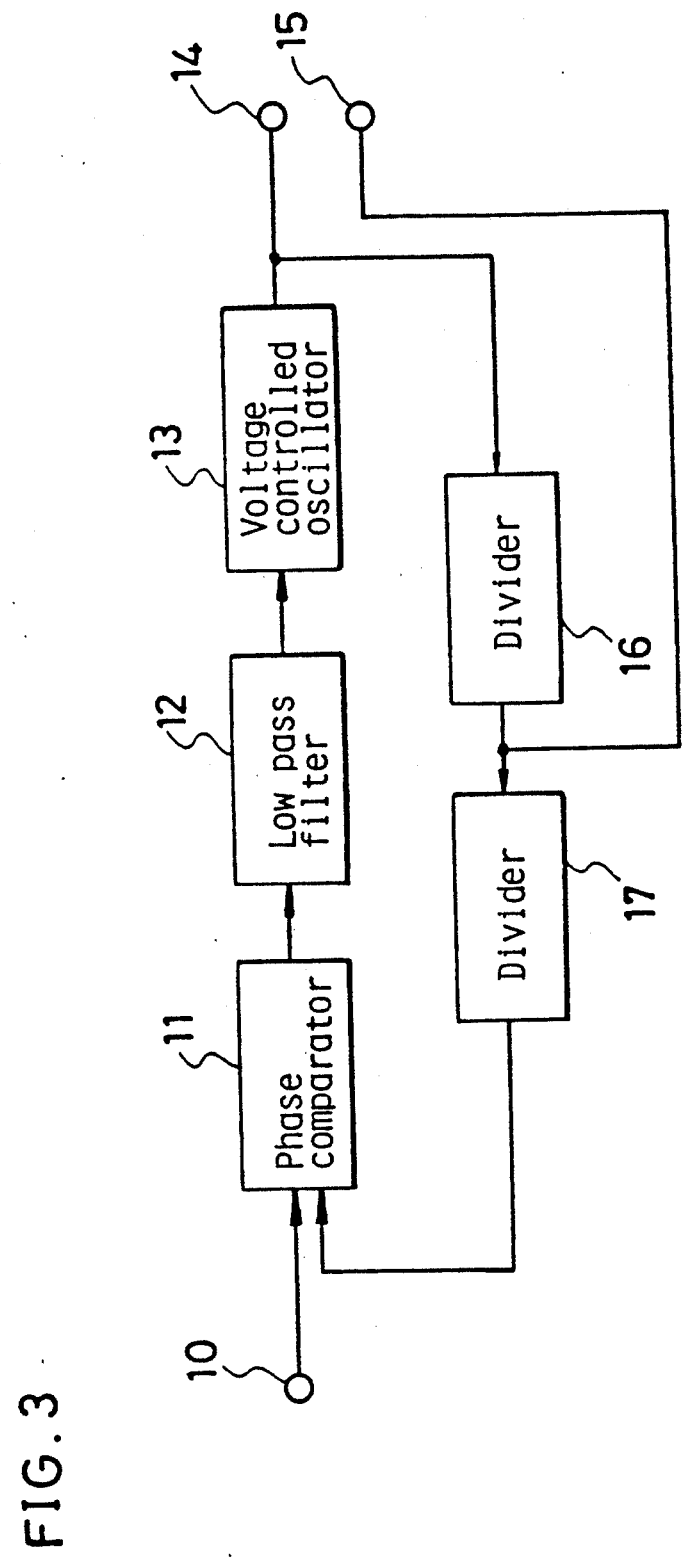
FIG. 3 is a block diagram of the clock signal generator in the block diagram of the embodiment.

Referring to FIG. 1, the output signal of the clock signal generator 6 is in synchronism with a horizontal synchronizing signal. The clock signal generator 6 can be composed of a PLL circuit (phase lock loop) as shown by FIG. 3. Referring to FIG. 3, the phase of the horizontal synchronizing signal inputted from an input terminal 10 is compared with the phase of the output of a divider 17 in a phase comparator 11. The output of the phase comparator 11 passes a low pass filter 12 and is applied to a voltage controlled oscillator 13 which is controlled by the output of the low pass filter 12. The output of the voltage controlled oscillator 13 is applied to the divider 17 through a divider 16.

In the NTSC color television system, when a dividing ratio of the divider 16 is 1:2 and that of the divider 17 is 1:858, a clock signal of 27 MHz which is 1716 times of the frequency of the horizontal synchronizing signal is output on an output terminal 14. On the other hand, a clock signal of 13.5 MHz which is 858 times of the frequency of the horizontal synchronizing signal is output on an output terminal 15.

Operation of the embodiment is elucidated hereafter.

Figure 4A:
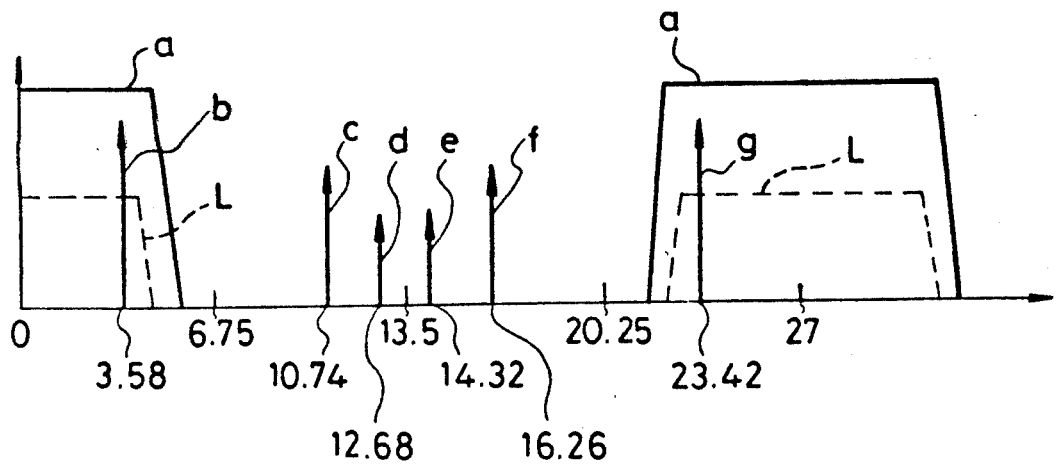
FIG. 4(a), FIG. 4(b) and FIG. 4(c) are charts of frequency spectrum distributions of a video signal of the NTSC color television system in the present invention.

A video signal inputted from a terminal 1 is sampled in a sampling circuit 2A and is converted into digital signals by the A/D converter 2B. Frequency spectrum distribution in the data of the digital signals is shown in FIG. 4(a). Referring to FIG. 4(a), frequency ranges of a luminance signal are shown by dashed lines L.

In the embodiment, the sampling frequency is 27 MHz, consequently, the frequency spectrum distribution is symmetrical with respect to the frequency of 13.5 MHz. A signal shown by an arrow "g" is an aliasing signal of a carrier chrominance signal shown by an arrow "b". The third harmonic signal component (10.74 MHz) of the carrier chrominance signal (3.58 MHz) is shown by an arrow "c", and the fourth harmonic signal component (14.32 MHz) thereof is shown by an arrow "e". The signal as shown by an arrow "f" is an aliasing signal of the signal as shown by the arrow "c", and the signal shown by an arrow "d" is an aliasing signal of the signal shown by the arrow "e".

Figure 4B:
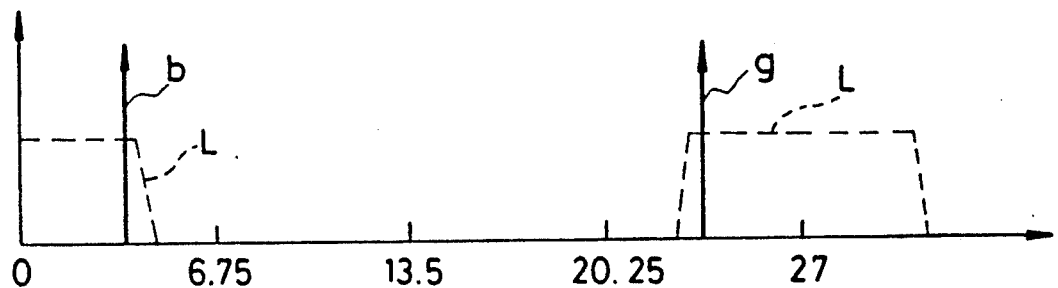

The digital signals are applied to the digital low pass filter 3 having a frequency response shown by real lines "a" in analogue representation. Thus, the output spectrum distribution of the digital low pass filter 3 is shown by FIG. 4(b). Referring to FIG. 4(b), the harmonics as shown by the arrows "c" and "e", and the aliasing signals shown by the arrows "f" and "d" are eliminated.

Figure 4C:
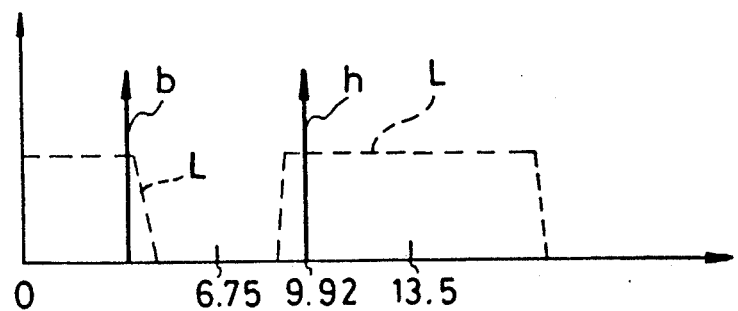
Figure 5:
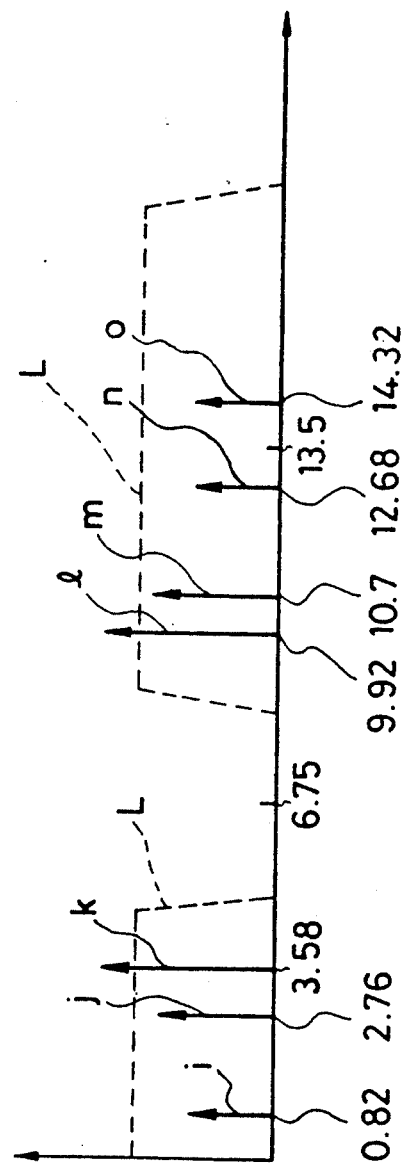
FIG. 5 is the chart of the frequency spectrum distribution of the NTSC color television system in the prior art.
Figure 6:
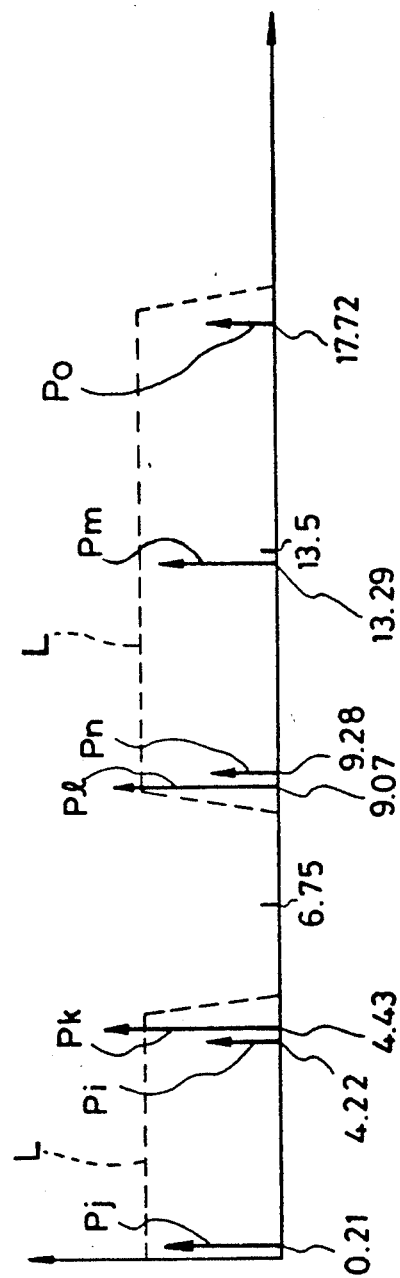
FIG. 6 is the chart of the frequency spectrum distribution of the PAL color television system in the prior art.

Subsequently, the data of the digital signals sampled by the sampling frequency of 27 MHz are alternately decimated so that the sampling frequency is reduced down to the frequency of 13.5 MHz which is a half of 27 MHz in appearance as shown in FIG. 4(c). For example, in data of successive digital signals designated by $D_1$, $D_2$, $D_3$, $D_4$, $D_5$, $D_6$, ... $D_n$ (n: integer), even numbered data $D_2$, $D_4$, $D_6$ ... $D_{2n}$ are eliminated, and odd numbered data $D_1$, $D_3$, $D_5$, ... $D_{2n-1}$ remain. Referring to FIG. 4(c), the signal shown by an arrow "h" is an aliasing signal of the carrier chrominance signal shown by the arrow "b".

As shown by FIG. 4(c). no detrimental signal arises in the frequency range of the video signal, and the luminance signal and the chrominance signal are not influenced by beat interference. Consequently, it is not necessary to synchronize the sampling signal with the carrier chrominance signal, and thus the frequency of the sampling signal can be freely selected.

Though in the above-mentioned embodiment, the sampling frequency of 27 MHz which is twice of the sampling frequency in the prior art is selected, another sampling frequency in which the aliasing signal thereof does not enter in the frequency range of the video signal can be selected. Furthermore, the present invention is applicable to the PAL color television system as well as in the NTSC color television system.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A digital video signal processing apparatus comprising:
    sampling means for sampling a video signal with a sampling frequency of at least four times of a frequency range of said video signal,
    an A/D converter for converting sampled signals of said video signal into digital signals,
    a digital low pass filter having a cut-off frequency of said frequency range of said video signal, and
    a decimation circuit for reducing a sampling frequency in appearance to at least two times of said frequency range of said video signal by decimating the number of said digital signals.

2. A digital video signal processing apparatus in accordance with claim 1, wherein
    said sampling frequency and a sampling frequency of said decimation circuit are in synchronism with a horizontal synchronizing signal of said video signal.

3. A digital video signal processing apparatus comprising:
    sampling means for sampling a video signal with a sampling frequency of 27 MHz.
    an A/D converter for converting sampled signals of said video signal into digital signals,
    a digital low pass filter for passing only said video signal converted in said digital signals,
    a decimation circuit for decimating the number of said digital signals into half of the number of said sampled signals,
    a clock signal generator for generating a clock signal having a frequency of a ratio of integers with respect to said sampling frequency and synchronizing with a horizontal synchronizing signal of said video signal,
    a Y/C-separating circuit for separating a luminance signal from a carrier chrominance signal of the output of said decimation circuit, and
    a demodulation circuit for demodulating the output of said Y/C-separating circuit to obtain a color difference signal.

4. A digital video signal processing apparatus in accordance with claim 3, wherein
    said digital low pass filter is a transversal filter comprising
    a plurality of D-flip-flop circuits which are connected in series and delay an input signal in synchronism with said clock signal,
    coefficient circuits connected to the output of each D-flip-flop circuit, and
    adders for adding outputs of said coefficient circuits.

5. A digital video signal processing apparatus in accordance with claim 3, wherein
    said clock signal generator comprises
    a voltage-controlled oscillator for oscillating a signal of a frequency corresponding to an input level,
    dividing means for dividing a clock signal output from said voltage controlled oscillator,
    a phase comparator for comparing said horizontal synchronizing signal with an output of said dividing means, and
    a low pass filter for eliminating a higher component of the output of said phase comparator,
    said input of said voltage control oscillator being responsive to an output level of said of said low pass filter.

6. A digital video signal processing method comprising the steps of:
    sampling a video signal with a sampling frequency of at least four times of a frequency range of said video signal,
    converted sampled signals of said video signal into digital signals,
    eliminating digital signals exceeding said frequency range of said video signal, and
    reducing a sampling frequency in appearance to at least two times of said frequency range of said video signal by decimating the number of said digital signals.

* * * * *